(12) United States Patent
Liu et al.

(10) Patent No.: US 12,372,861 B2  
(45) Date of Patent: Jul. 29, 2025

(54) PROJECTION DEVICE

(71) Applicant: Coretronic Corporation, Hsin-Chu (TW)

(72) Inventors: Wei-Chi Liu, Hsin-Chu (TW); Meng-Syuan Dai, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 0 days.

(21) Appl. No.: 17/944,191

(22) Filed: Sep. 14, 2022

(65) Prior Publication Data

US 2023/0101677 A1 Mar. 30, 2023

(30) Foreign Application Priority Data

Sep. 29, 2021 (CN) .......................... 202111149553.X

(51) Int. Cl.  
*G03B 21/16* (2006.01)  
*G03B 21/20* (2006.01)

(52) U.S. Cl.  
CPC ......... *G03B 21/16* (2013.01); *G03B 21/2033* (2013.01)

(58) Field of Classification Search  
CPC ... G03B 21/2033; G03B 21/16; G03B 21/204  
USPC ......................................................... 353/54  
See application file for complete search history.

(56) References Cited

U.S. PATENT DOCUMENTS 9,841,664 B2 * 12/2017 Nagatani .............. H04N 9/3155  
2019/0094669 A1 * 3/2019 Yanagisawa ......... G02B 27/149

FOREIGN PATENT DOCUMENTS

| CN | 205450547 | | 8/2016 |
| CN | 206674407 | | 11/2017 |
| CN | 108227351 | | 6/2018 |
| CN | 210348177 | U * | 4/2020 |
| CN | 112764302 | | 5/2021 |
| JP | 2005338715 | A * | 12/2005 |
| TW | 201107864 | | 3/2011 |
| WO | 2015113979 | | 8/2015 |
| WO | 2020253164 | | 12/2020 |

OTHER PUBLICATIONS

Foreign Document (Year: 2024).*  
Translation of JP 2005338715 A (Year: 2024).*  
Translation of CN 210348177 (Year: 2024).*

* cited by examiner

*Primary Examiner* — Jerry L Brooks  
(74) *Attorney, Agent, or Firm* — JCIPRNET

(57) ABSTRACT

Provided is a projection device including an illumination system, an optical engine module, a projection lens, at least one first case, at least one second case, and at least one optical element. The at least one first case includes a first flow channel to transmit a first fluid therein. The at least one second case is connected to the at least one first case to form an accommodating space. The at least one optical element is disposed in the accommodating space. Heat generated by the at least one optical element is transferred, by the first fluid, to an outside of the at least one first case.

12 Claims, 12 Drawing Sheets

PROJECTION DEVICE

CROSS-REFERENCE TO RELATED APPLICATION

This application claims the priority benefit of China application serial no. 202111149553.X, filed on Sep. 29, 2021. The entirety of the above-mentioned patent application is hereby incorporated by reference herein and made a part of this specification.

BACKGROUND

Technical Field

The disclosure relates to a display device, and more particularly, to a projection device having a high thermal conductive case.

Description of Related Art

A projection device is a display device used to generate large-size images. With the evolution and innovation of technology, it has been continuously improved. An imaging principle of the projection device is to convert an illumination beam generated by an illumination system into an image beam through a light valve, and then project the image beam to a projection target (such as a screen or a wall) through a projection lens to form a projection image.

In recent development of the projection device, a laser light source is used as an excitation light source. An exciting beam emitted by the excitation light source irradiates a wavelength conversion device (such as a phosphor wheel or a phosphor turntable), and after a wavelength conversion material on the wavelength conversion device absorbs the exciting beam, conversion beams with different wavelengths are generated. The above wavelength conversion device generates heat during the excitation process, and thus a heat dissipation device is disposed around the wavelength conversion device.

In the conventional technology, the wavelength conversion device is disposed in a wind channel. A heat exchanger for air and liquid is disposed in the wind channel, and the air circulating in the wind channel exchanges heat with external water. In addition to the above heat exchanger, the heat exchanger may also be disposed in the case of the wavelength conversion device to transfer the heat in the case to the outside for heat dissipation. However, in addition to the larger size of the wind channel due to the design of the circulating wind channel, the above heat dissipation device also requires the heat exchanger for air and liquid disposed in the wind channel, which also increases the assembly process and increase the difficulty in assembly.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a projection device, which may save a heat dissipation device disposed at an outer side of the first case to reduce difficulty in assembly.

Other objects and advantages of the disclosure may be further understood from the technical features disclosed herein.

In order to achieve one, a part, or all of the above objectives or other objectives, the disclosure provides a projection device, including an illumination system, an optical engine module, a projection lens, at least one first case, at least one second case, and at least one optical element. The illumination system is configured to provide an illumination beam. The optical engine module is disposed on a transmission path of the illumination beam to convert the illumination beam into an image beam. The projection lens is disposed on a transmission path of the image beam to project the image beam out of the projection device. The at least one first case includes a first flow channel to transmit a first fluid therein. The at least one second case is connected to the at least one first case to form an accommodating space. The at least one optical element is disposed in the accommodating space. Heat generated by the at least one optical element is transferred, by the first fluid, to an outside of the at least one first case.

In an embodiment of the disclosure, the at least one optical element is a wavelength conversion device of the illumination system, at least one light valve of the optical engine module, a prism element of the optical engine module, a part of the projection lens, or a combination of any number of the above.

In an embodiment of the disclosure, the projection device further includes at least one heat dissipation element disposed in the accommodating space to dissipate the heat from the at least one optical element.

In an embodiment of the disclosure, the at least one optical element is directly connected to the at least one first case.

In an embodiment of the disclosure, the at least one first case further includes multiple heat dissipation fins connected to the first flow channel and located in the accommodating space.

In an embodiment of the disclosure, the at least one first case further includes at least one first fastening structure correspondingly connected to the at least one second case.

In an embodiment of the disclosure, the at least one second case includes at least one second fastening structure correspondingly connected to the at least one first fastening structure.

In an embodiment of the disclosure, the at least one second case includes a second flow channel to transmit a second fluid therein, and the heat generated by the at least one optical element is transferred, by the second fluid, to an outside of the at least one second case.

In an embodiment of the disclosure, the first flow channel is connected to the second flow channel, and the first fluid flows through the second flow channel.

In an embodiment of the disclosure, the projection device further includes a cooling device connected to the at least one first case to cool and transmit the first fluid. The cooling device and the at least one first case form a cooling system.

In an embodiment of the disclosure, a number of the at least one first cases is more than one, and the cooling device is connected between the first cases.

In an embodiment of the disclosure, the at least one first case further includes multiple flow channel fins disposed in the first flow channel.

Based on the above, the embodiments of the disclosure have at least one of the following advantages or effects. In the projection device of the disclosure, a part of the cases of the illumination system, the optical engine module, and/or the projection lens may be designed as the first case, and the first case includes the first flow channel to transmit the first fluid therein. The at least one optical element is disposed in the accommodating space formed by the first case and the second case, and the at least one optical element is the element in the illumination system, the optical engine module, and/or a part of the projection lens, so that the heat generated by the optical element is transferred, by the first fluid in the first case, to the outside of the first case. In this way, the optical element located in the illumination system, the optical engine module, and/or the projection lens may achieve the effect of heat dissipation through the first case, which may further save the fan device disposed at the outer side of the first case to reduce the difficulty in assembly and save the circulating air flow channel required by the fan device.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
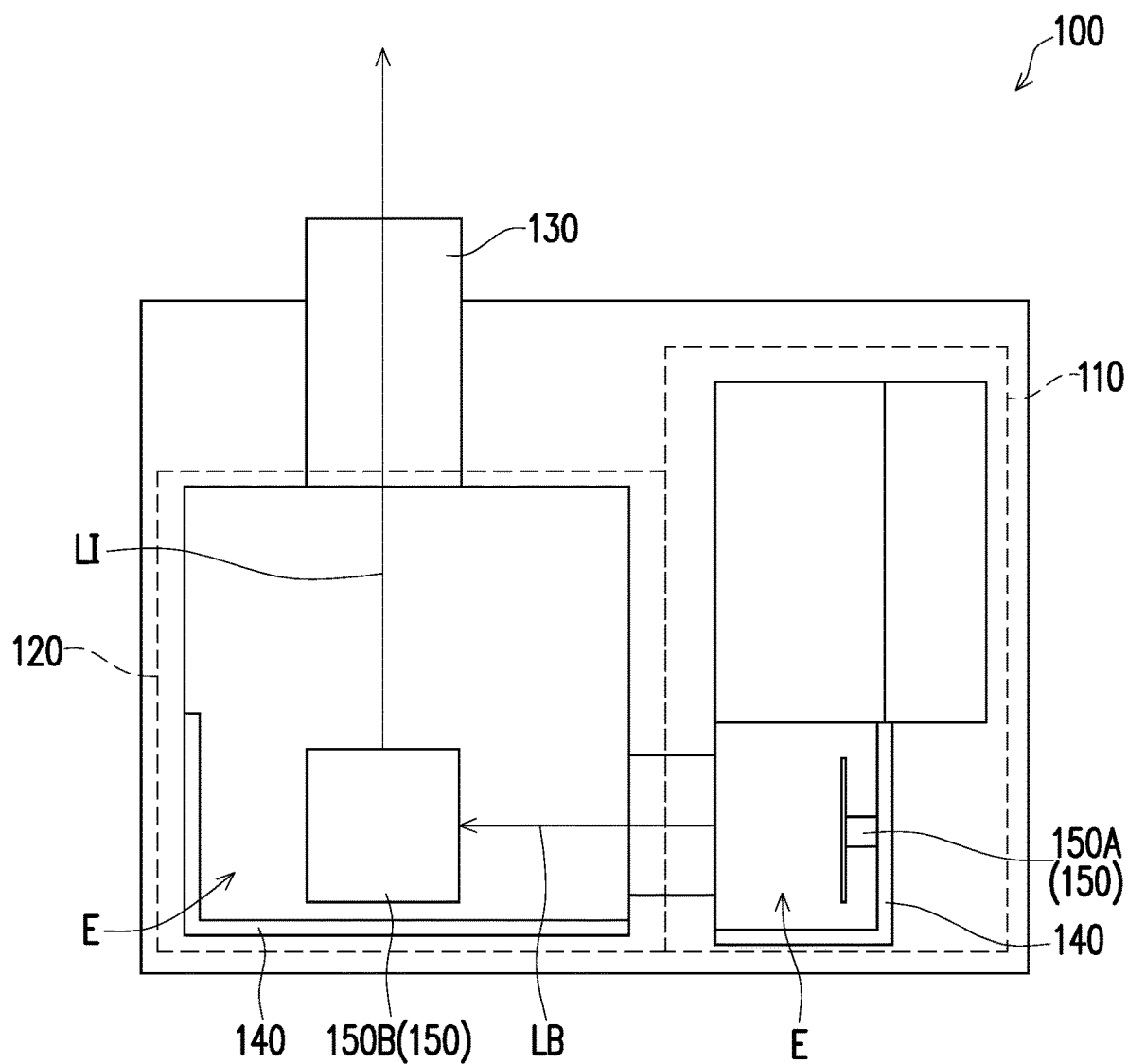
FIG. 1 is a schematic view of a projection device according to an embodiment of the disclosure.
Figure 2:
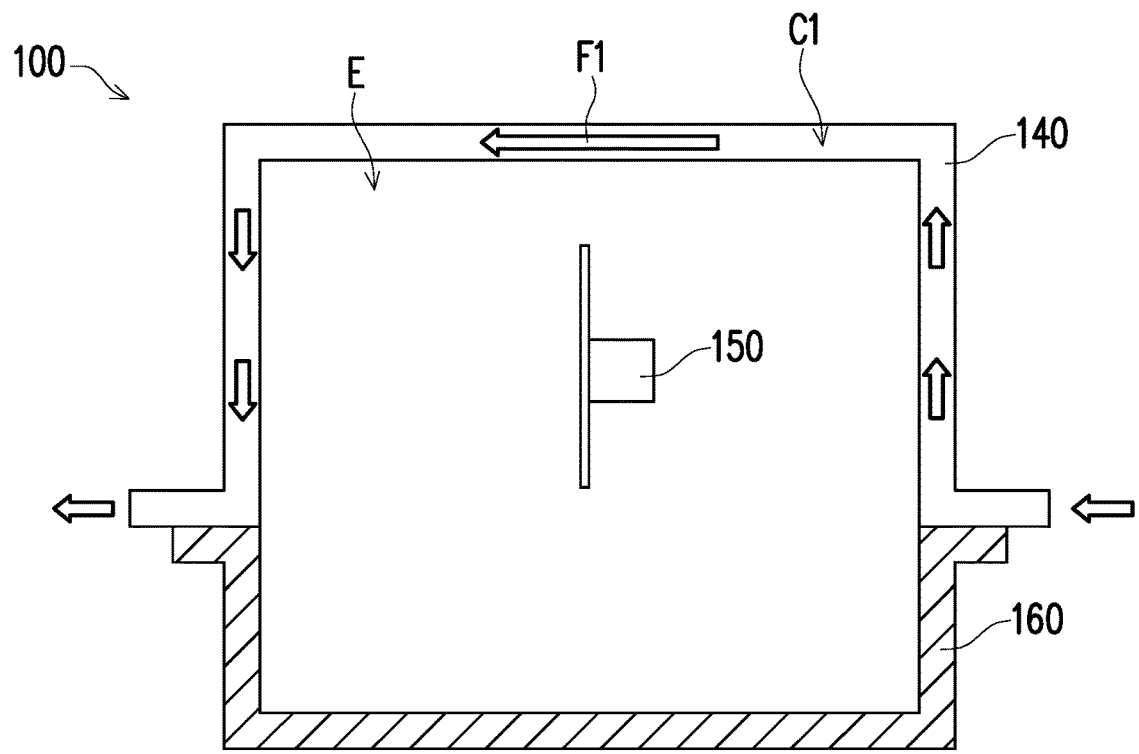
FIG. 2 is a schematic view of a part of a projection device according to another embodiment of the disclosure.

FIG. 1 is a schematic view of a projection device according to an embodiment of the disclosure, which is for the purpose of schematic illustration only. Referring to FIG. 1, a projection device 100 is provided in this embodiment, which includes an illumination system 110, an optical engine module 120, a projection lens 130, at least one first case 140, at least one optical element 150, and at least one second case 160 (as shown in FIG. 2). The illumination system 110 is configured to provide an illumination beam LB. The optical engine module 120 is disposed on a transmission path of the illumination beam LB to convert the illumination beam LB into an image beam LI. The projection lens 130 is disposed on a transmission path of the image beam LI, and is configured to project the image beam LI out of the projection device 100 to a projection target (not shown), such as a screen or a wall.

In detail, the illumination system 110 is formed by, for example, multiple light emitting elements, wavelength conversion elements, light homogenizing elements, filter elements, and multiple light splitting and combining elements to provide beams of different wavelengths, so as to form the illumination beam LB. The light emitting elements are, for example, a light emitting diode (LED) or a laser diode (LD). However, the disclosure provides no limitation to the type or form of the illumination system 110 in the projection device 100. The detailed structure and implementation of the illumination system 110 may be obtained from the common knowledge in the technical field with sufficient teaching, suggestion and implementation, so no further description is incorporated herein.

The optical engine module 120 is, for example, formed by multiple prism elements, at least one light valve, and multiple different types of optical elements to receive the illumination beam LB provided by the illumination system 110. The optical element 150 includes the light valve, and modulates the illumination beam LB into the image beam L1 through the light valve. The light valve is, for example, a reflective light modulator such as a liquid crystal on silicon panel (LCOS panel) or a digital micro-mirror device (DMD). In some embodiments, the light valve may also be a transmissive light modulator such as a transparent liquid crystal panel, an electro-optical modulator, a magneto-optic modulator, and an acousto-optic modulator (AOM). The disclosure provides no limitation to the form and type of the light valve. The detailed steps and implementation of the method for the light valve to convert the illumination beam LB into the image beam LI may be obtained from the common knowledge in the technical field with sufficient teaching, suggestion and implementation, and therefore no further description is incorporated herein. In this embodiment, the number of the light valves is one, for example, the projection device 100 using a single digital micro-mirror element. However, in other embodiments there may be more than one light valve, and the disclosure is not limited thereto.

The projection lens 130 includes, for example, one or a combination of multiple optical lenses with diopter values, such as various combinations of non-planar lenses including biconcave lenses, biconvex lenses, concave-convex lenses, convex-concave lenses, plane-convex lenses, plane-concave lenses, etc. In an embodiment, the projection lens 130 may further include a plane optical lens to project the image beam LI from the optical engine module 120 to the projection target in a reflective manner. The disclosure does not limit the form and type of the projector lens 130.

FIG. 2 is a schematic view of a part of a projection device according to another embodiment of the disclosure. Referring to FIGS. 1 and 2, a part of the projection device shown in FIG. 2 may at least be applied to the embodiment of FIG. 1. The at least one first case 140 includes a first flow channel C1 to transmit a first fluid F1 in the first flow channel C1, and the first fluid F1 is configured to transfer heat generated by the at least one optical element 150 to an outside of the at least one first case 140. The first fluid F1 is, for example, water, but the disclosure is not limited thereto. The at least one second case 160 is connected to the at least one first case 140 to form an accommodating space E, and the at least one optical element 150 is disposed in the accommodating space E. In other words, in this embodiment, the first case 140 is a case with high thermal conductivity, and the second case 160 is a metal case and does not have a flow channel.

The optical element 150 may be disposed in at least one of the illumination system 110, the optical engine module 120, and the projection lens 130, and the heat generated by the optical element 150 is transferred, by the first fluid F1 transmitted inside the at least one first case 140, to the outside of the at least one first case 140 by means of heat convection, so as to achieve an effect of heat dissipation of the optical element 150. The optical element 150 may be defined as a wavelength conversion device of the illumination system 110, the at least one light valve of the optical engine module 120, and the prism element of the optical engine module 120, or any combination of any number of the above. For example, in the embodiment of FIG. 1, an optical element 150A is, for example, the wavelength conversion device (a phosphor wheel) of the illumination system 110, and an optical element 150B is, for example, the at least one light valve and the prism element (such as a TIR prism). In this way, the optical element 150 located in the illumination system 110 and the optical engine module 120 may achieve the effect of heat dissipation through a configuration of the at least one first case 140. In addition, at least one first case 140 may also cover a part of the projection lens 130, and the effect of heat dissipation of the projection lens 130 may be achieved through the first case 140. The above configuration may further save a fan device disposed at an outer side of the first case to reduce difficulty in assembly and save a circulating air flow channel required by the fan device.

Figure 3:
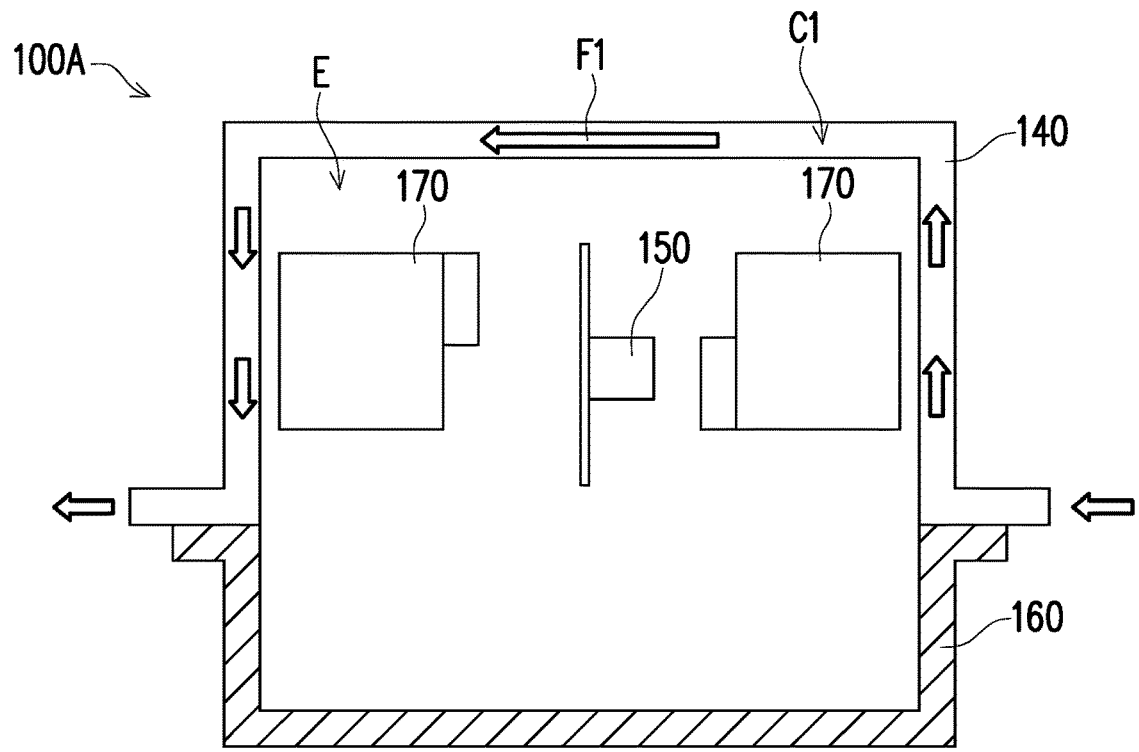
FIG. 3 is a schematic view of a part of a projection device according to another embodiment of the disclosure.

FIG. 3 is a schematic view of a part of a projection device according to another embodiment of the disclosure. Referring to FIG. 3, a part of a projection device 100A shown in this embodiment is similar to the projection device 100 shown in FIG. 2. A difference between the two is that, in this embodiment, the projection device 100A further includes at least one heat dissipation element 170, which is disposed in the accommodating space E to dissipate the heat from the optical element 150 (the phosphor wheel). For example, in this embodiment, the heat dissipation element 170 is, for example, a fan, and the number of the heat dissipation elements 170 is, for example, two, which are respectively disposed at two opposite sides of the optical element 150. In this way, the convection effect in the accommodating space E may be further improved, and the heat may be effectively transferred to the at least one first case 140, thereby improving the effect of heat dissipation of the optical element 150.

Figure 4:
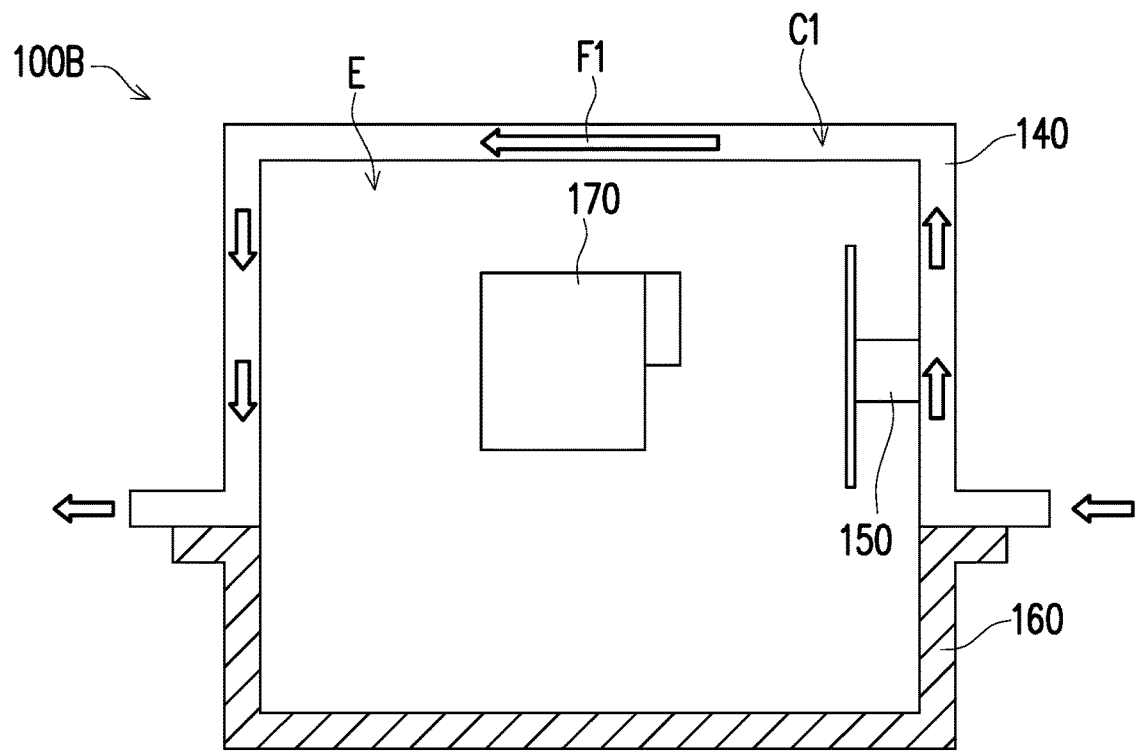
FIG. 4 is a schematic view of a part of a projection device according to another embodiment of the disclosure.

FIG. 4 is a schematic view of a part of a projection device according to another embodiment of the disclosure. Referring to FIG. 4, a part of a projection device 100B shown in this embodiment is similar to the projection device 100A shown in FIG. 3. A difference between the two is that, in this embodiment, the optical element 150 is directly connected to the at least one first case 140. The heat dissipation element 170 is disposed in the accommodating space E to dissipate the heat from the optical element 150. In this way, the heat generated by the optical element 150 is transferred to the at least one first case 140 by means of heat conduction, which may further improve the effect of heat dissipation.

Figure 5:
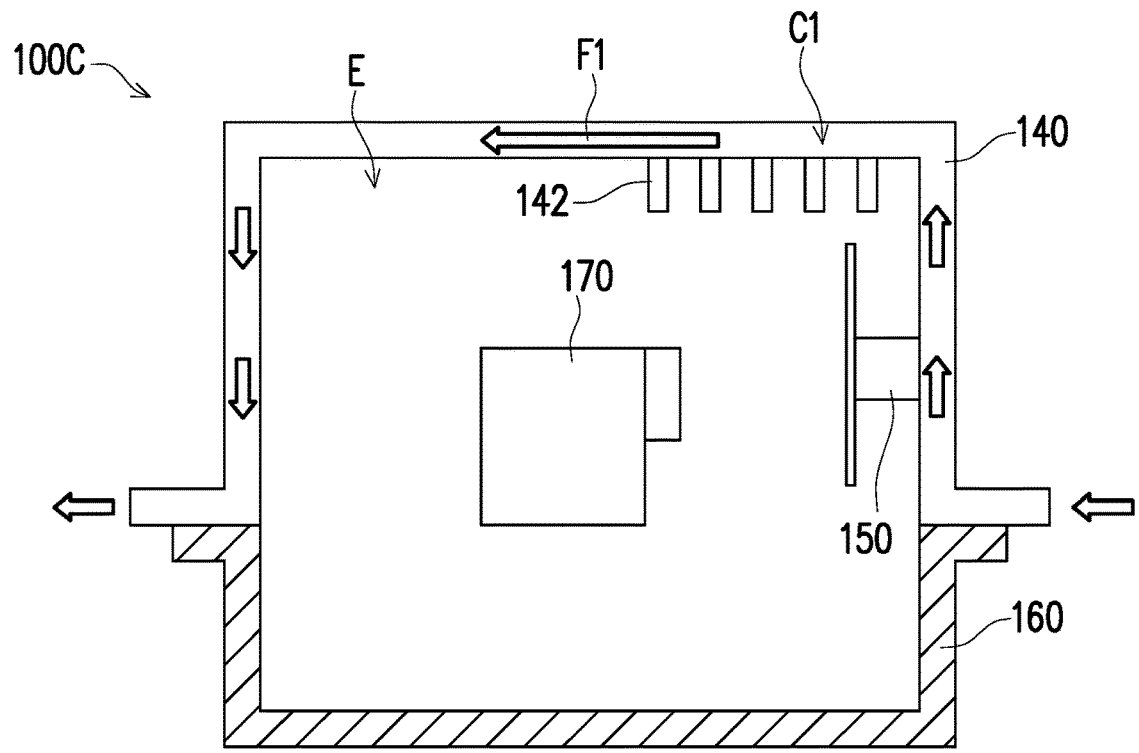
FIG. 5 is a schematic view of a part of a projection device according to another embodiment of the disclosure.

FIG. 5 is a schematic view of a part of a projection device according to another embodiment of the disclosure. Referring to FIG. 5, a part of a projection device 100C shown in this embodiment is similar to the projection device 100B shown in FIG. 4. A difference between the two is that, in this embodiment, the first case 140 further includes multiple heat dissipation fins 142, which are connected to the first flow channel C1, and are located in the accommodating space E. When the optical element 150 (the phosphor wheel) generates the heat, a part of the heat is directly taken away by the first fluid F1 by means of heat conduction, while another part of the heat is brought to the air in the accommodating space E by the heat dissipation element 170 by means of heat convection. The heat carried by the air in the accommodating space E is transferred to the heat dissipation fins 142, and then conducted to the first fluid F1 by the heat dissipation fins 142. In this way, an effect of heat convection in the accommodating space E may be further improved, thereby improving the effect of heat dissipation.

Figure 6A:
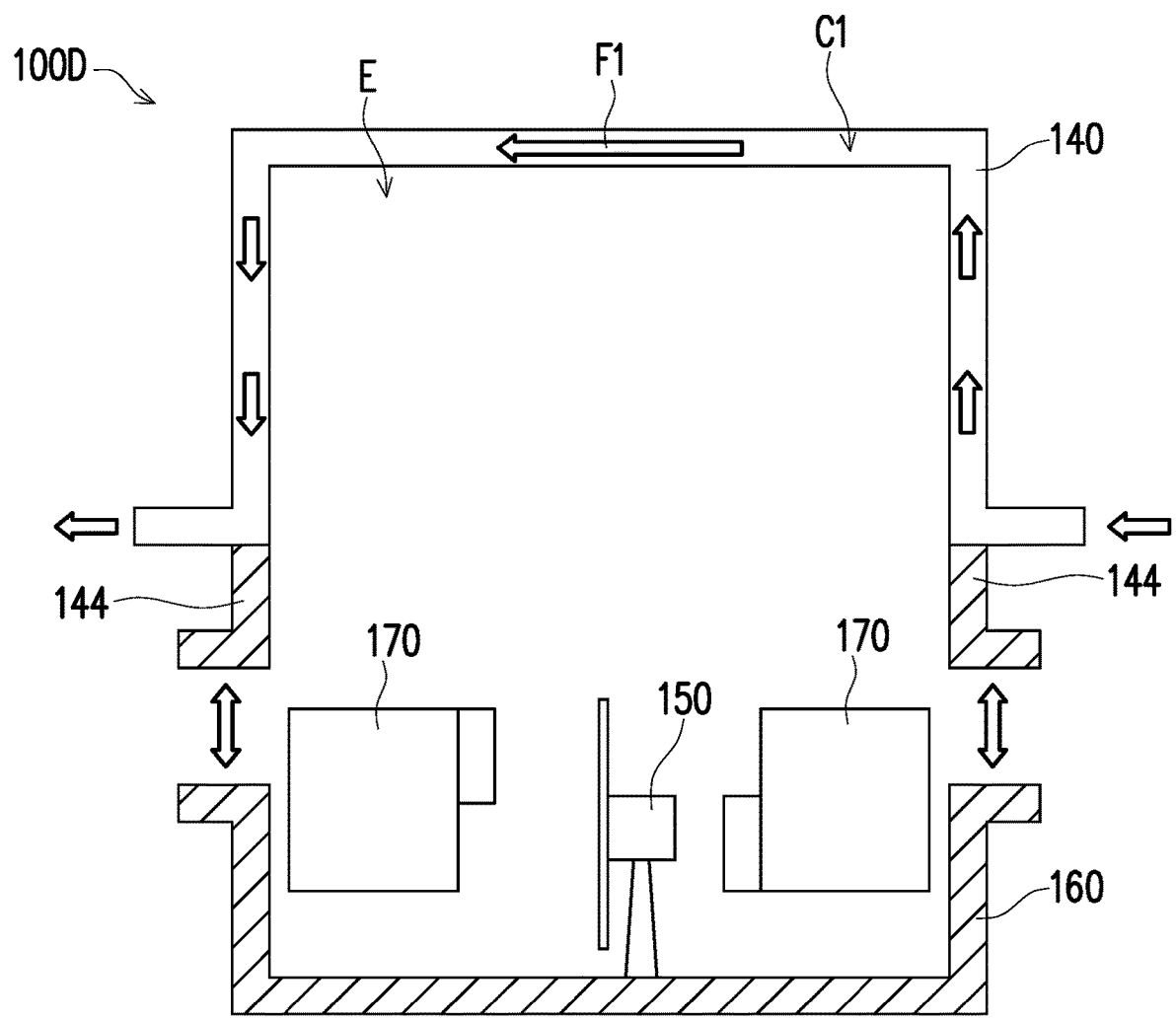
FIGS. 6A and 6B are respectively schematic views of a part of a projection device before and after assembly according to another embodiment of the disclosure.
Figure 6B:
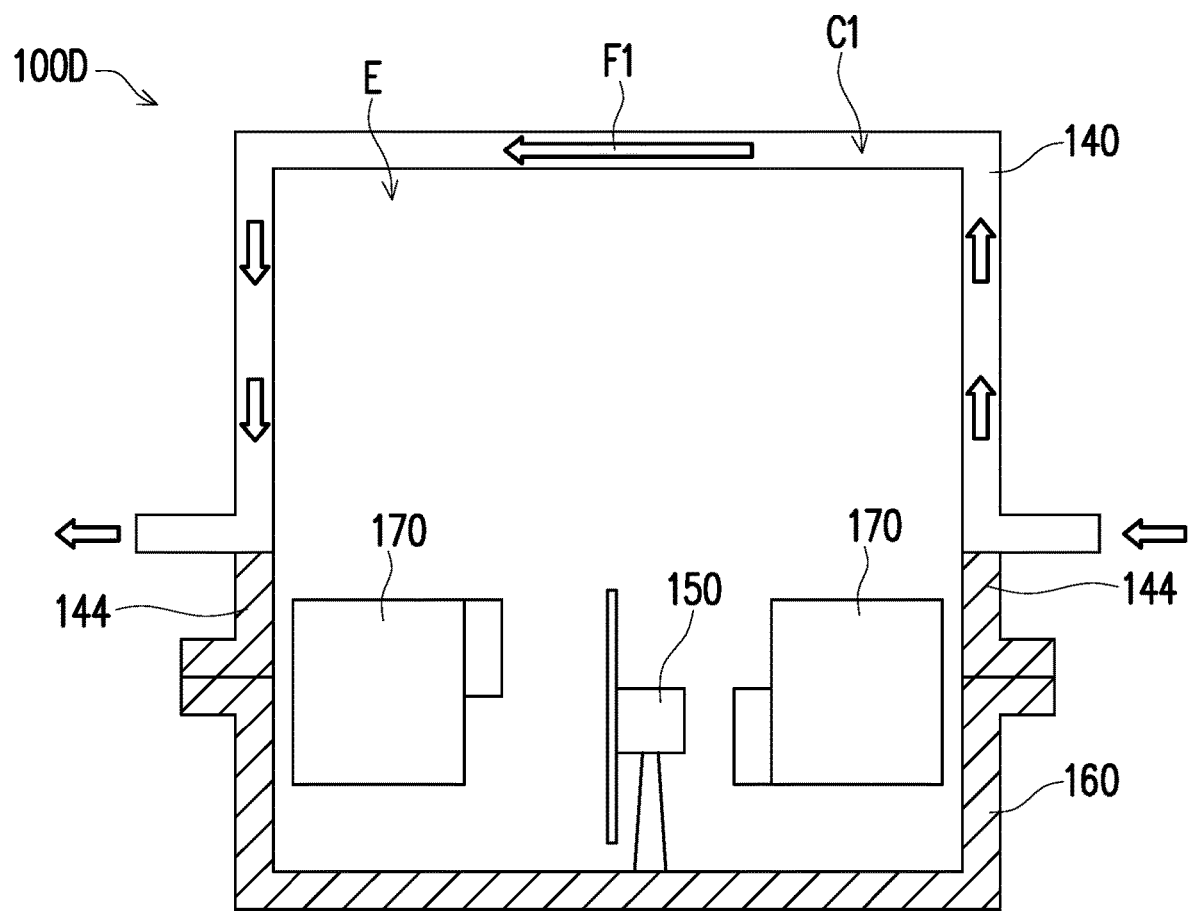

FIGS. 6A and 6B are respectively schematic views of a part of a projection device before and after assembly according to another embodiment of the disclosure. Referring to FIGS. 6A and 6B, a part of a projection device 100D shown in this embodiment is similar to the projection device 100A shown in FIG. 3. A difference between the two is that, in this embodiment, the first case 140 further includes at least one first fastening structure 144, which is correspondingly connected to the second case 160. In this embodiment, the number of the first fastening structures 144 is, for example, two, which are respectively disposed at a front end and a rear end of the first case 140. In this way, airtightness of the first case 140 and the second case 160 may be enhanced. Except that external dust may not enter the accommodating space E, the effect of internal heat convection is further improved, and heat exchange between the air in the accommodating space E and the first case 140 is enhanced.

Figure 7:
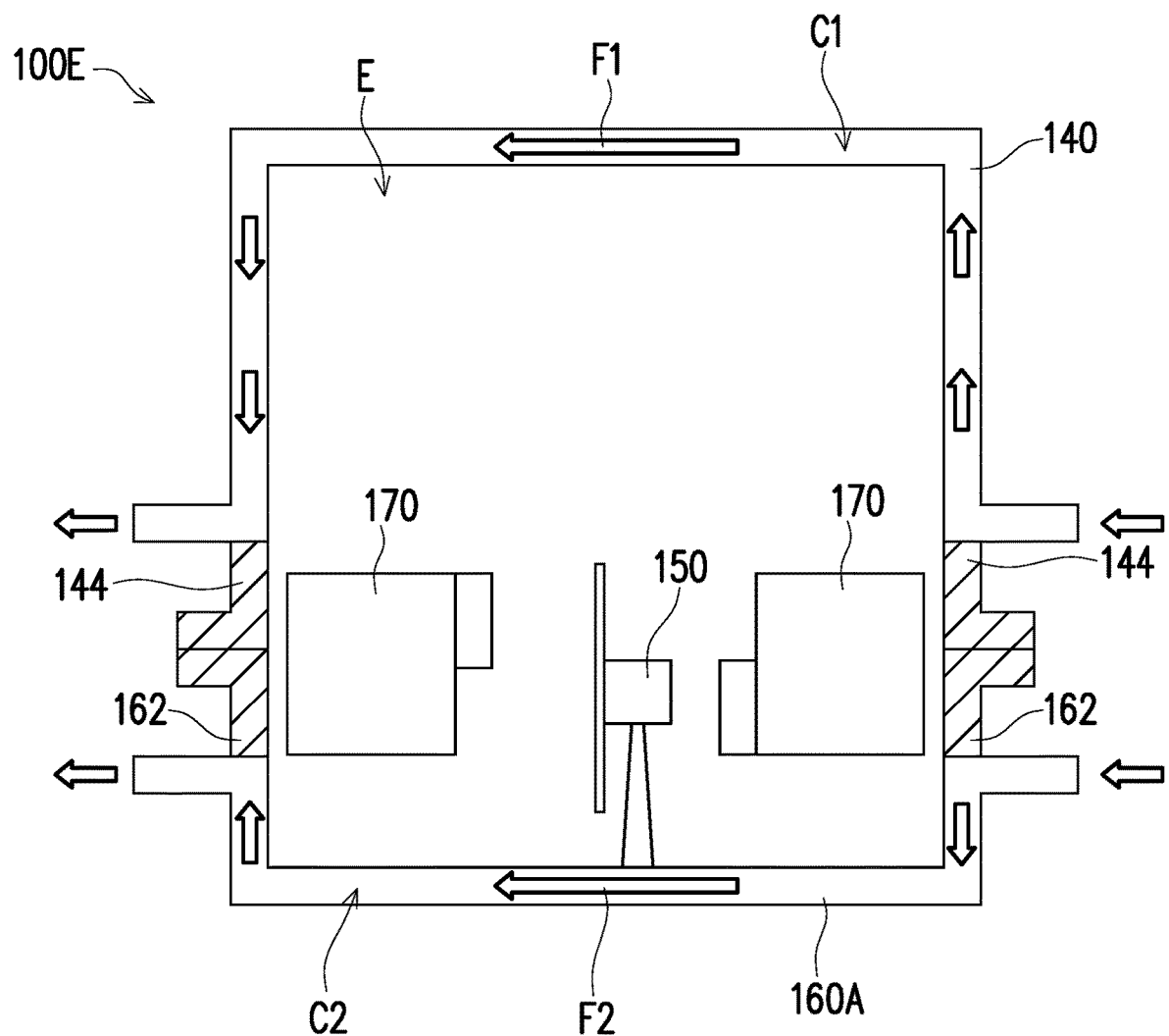
FIG. 7 is a schematic view of a part of a projection device according to another embodiment of the disclosure.

FIG. 7 is a schematic view of a part of a projection device according to another embodiment of the disclosure. Referring to FIG. 7, a part of a projection device 100E shown in this embodiment is similar to the projection device 100D shown in FIG. 6B. A difference between the two is that, in this embodiment, a second case 160A includes a second flow channel C2 to transmit a second fluid F2 in the second case 160A, and the heat generated by the optical element 150 is further transferred, by the second fluid F2, to an outside of the second case 160A. In other words, in this embodiment, both the first case 140 and the second case 160A are cases with high thermal conductivity, and have their own independent flow channels. In this embodiment, a transmitting direction of the first fluid F1 is the same as a transmitting direction of the second fluid F2. In addition, the second case 160A includes at least one second fastening structure 162, which is correspondingly connected to the at least one first fastening structure 144. In this way, the optical element 150 may achieve better effect of heat dissipation through the configurations of both the first case 140 and the second case 160A.

Figure 8:
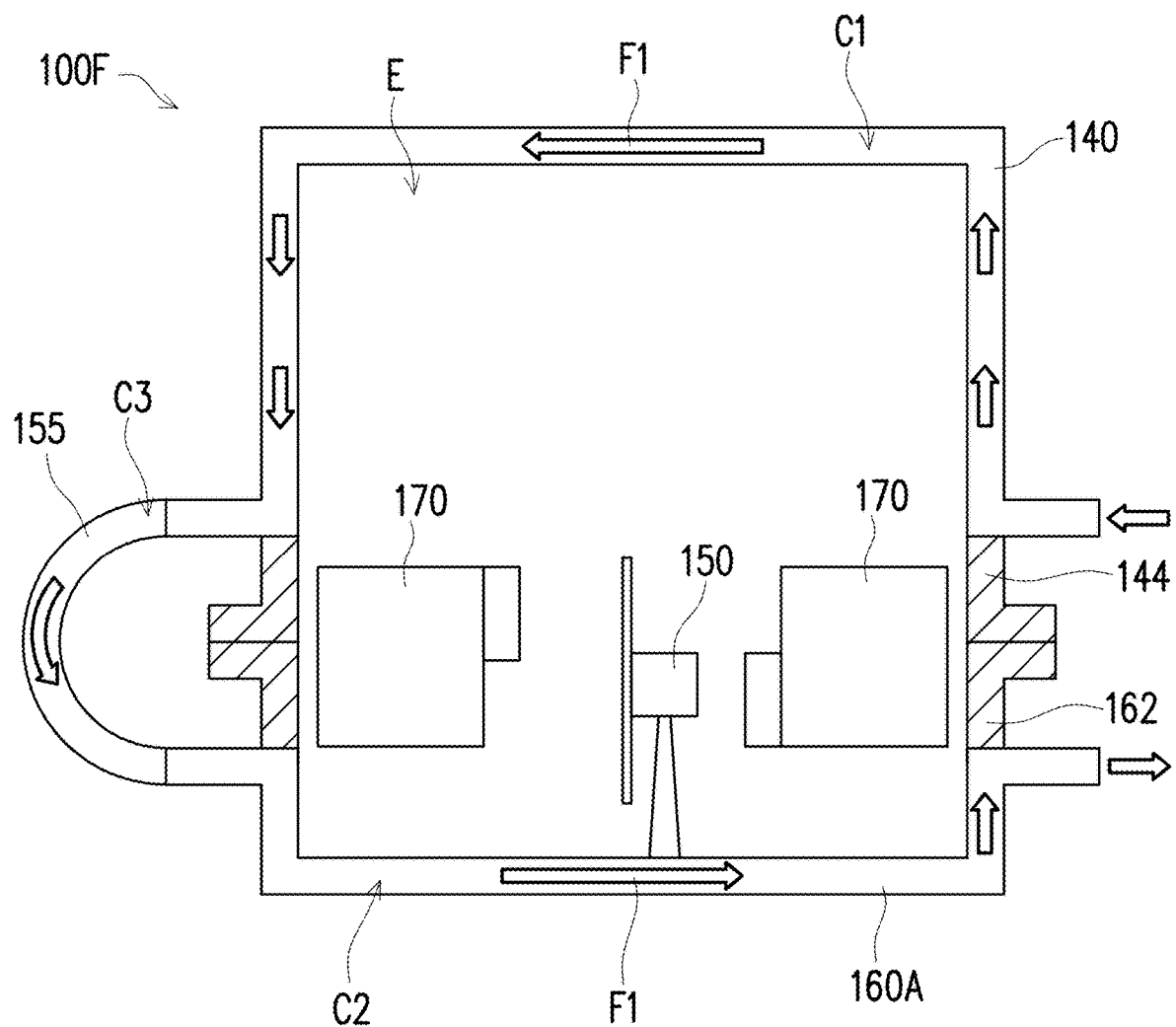
FIG. 8 is a schematic view of a part of a projection device according to another embodiment of the disclosure.

FIG. 8 is a schematic view of a part of a projection device according to another embodiment of the disclosure. Referring to FIG. 8, a part of a projection device 100F shown in this embodiment is similar to the projection device 100D shown in FIG. 6B. A difference between the two is that, in this embodiment, the first flow channel C1 is connected to the second flow channel C2, and the first fluid F1 flows through the second flow channel C2. In this embodiment, for example, a connecting member 155 is disposed between the first flow channel C1 and the second flow channel C2, and the connecting member 155 has a third flow channel C3 to connect the first flow channel C1 to the second flow channel C2. The connecting member 155 may be connected with the first case 140 and the second case 160A by welding, assembling, or integrally forming. In this way, the optical element 150 may achieve the effect of heat dissipation through the configurations of both the first case 140 and the second case 160A.

Figure 9:
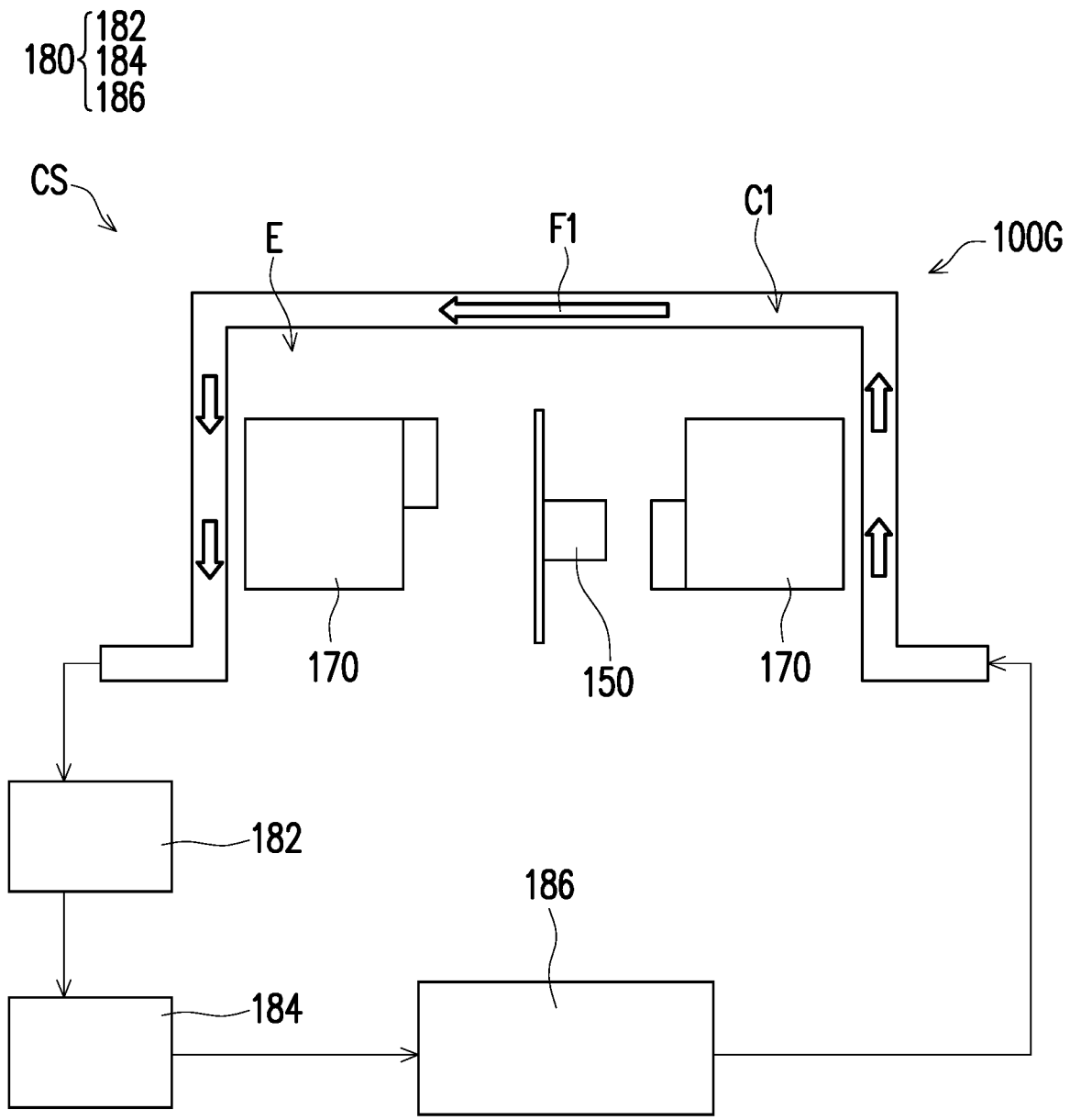
FIG. 9 is a schematic view of a part of a projection device according to another embodiment of the disclosure.

FIG. 9 is a schematic view of a part of a projection device according to another embodiment of the disclosure. Referring to FIG. 9, a part of a projection device 100G shown in this embodiment is similar to the projection device 100 shown in FIG. 2. A difference between the two is that, in this embodiment, the projection device 100G further includes a cooling device 180, which is connected to the first case 140 to cool and transmit the first fluid F1. In addition, the cooling device 180 and the first case 140 form a cooling system CS. In detail, in this embodiment, the cooling device 180 includes components such as a heat exchanger 182, a tank 184, and a pump 186, which are connected to the first case 140, and the first fluid F1 flows in the cooling system CS. In this way, the optical element 150 may achieve the effect of heat dissipation through the configuration of the first case 140, which may further save the fan device disposed at the outer side of the first case to reduce the difficulty in assembly and save the circulating air flow channel required by the fan device.

Figure 10:
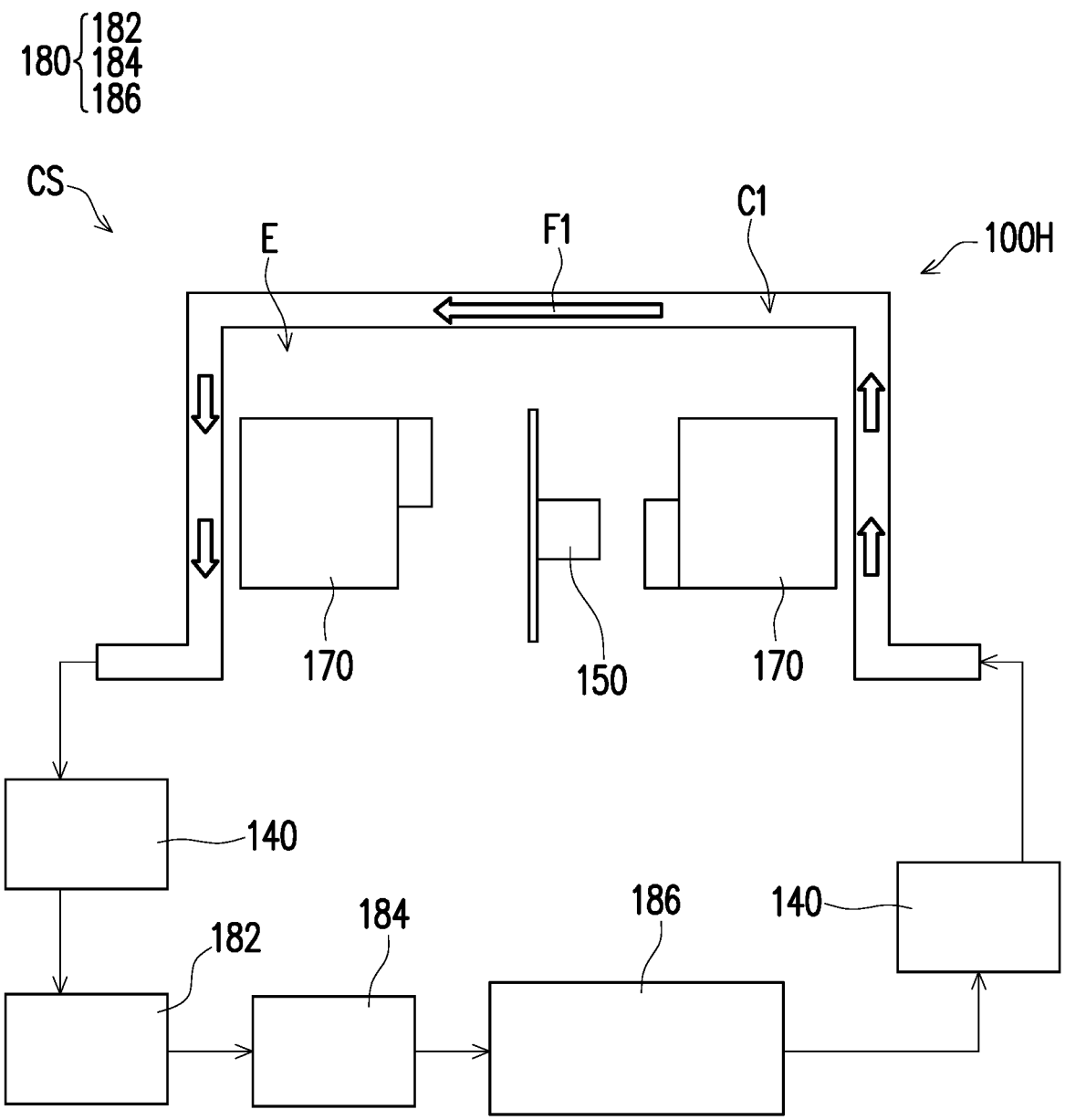
FIG. 10 is a schematic view of a part of a projection device according to another embodiment of the disclosure.

FIG. 10 is a schematic view of a part of a projection device according to another embodiment of the disclosure. Referring to FIG. 10, a part of a projection device 100H shown in this embodiment is similar to the projection device 100G shown in FIG. 9. A difference between the two is that, in this embodiment, the number of the first cases 140 of the projection device 100H is more than one, and the cooling device 180 is connected between the first cases 140. In this way, the optical elements 150 may achieve the effect of heat dissipation through the configuration of the first cases 140. For example, the optical elements 150 are the light emitting elements, the light valves, prisms, or a part of the projection lens. The first cases 140 may individually surround the optical element 150 or a part of the optical element 150. In addition, in other embodiments, the first case 140 of the projection device 100H may cover the illumination system 110, the optical engine module 120, and a part of the projection lens 130. The heat generated by the optical elements 150 is transferred, by the first case 140, to the outside of the first case 140, which may further save the fan device disposed at the outer side of the first case to reduce the difficulty in assembly and save the circulating air flow channel required by the fan device.

Figure 11:
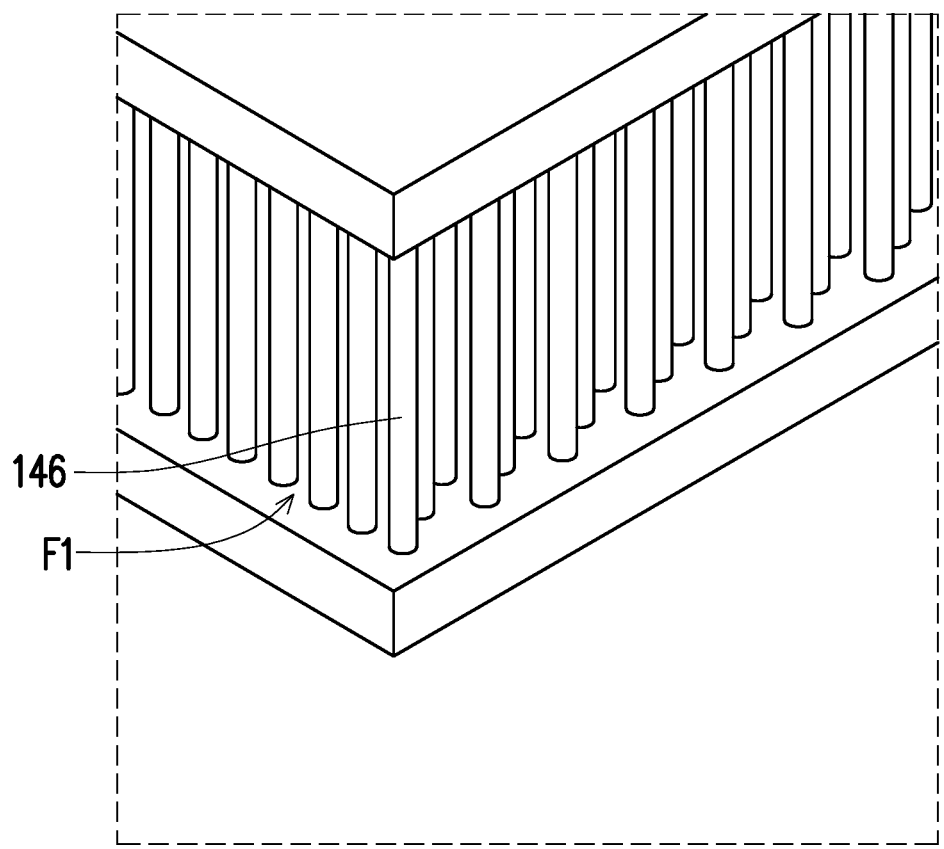
FIG. 11 is a partially enlarged schematic view of an inside of a first case in FIG. 2.
Figure 12:
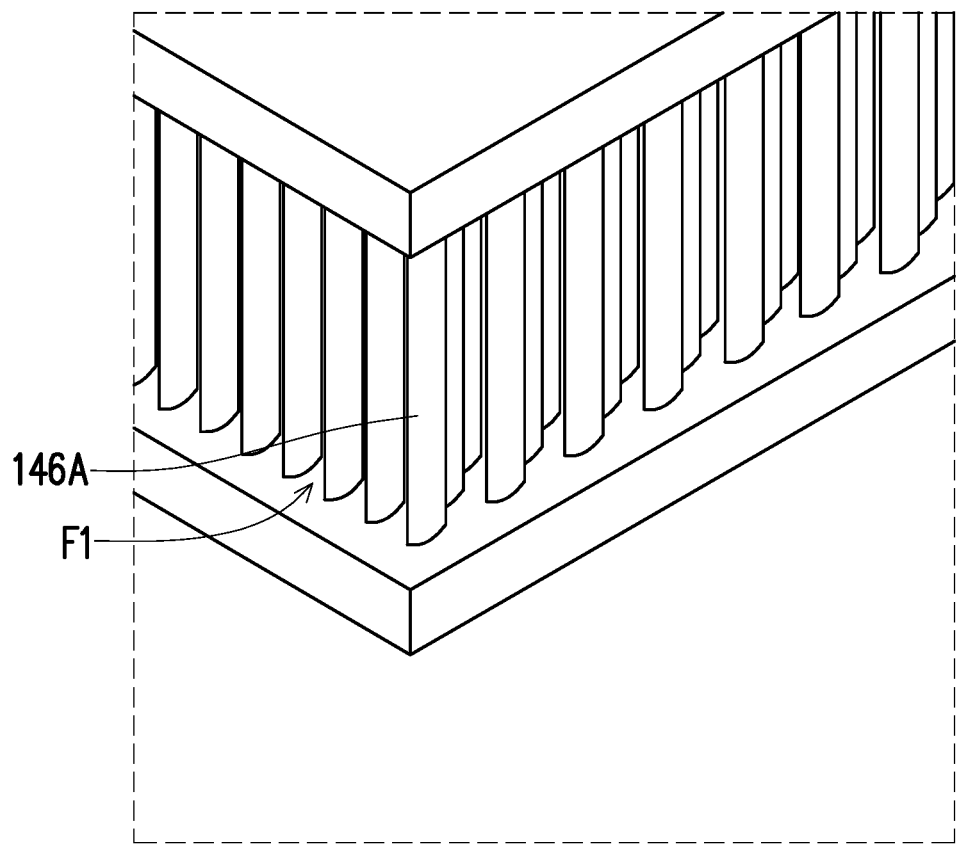
FIG. 12 is a partially enlarged schematic view of an inside of a first case according to another embodiment of the disclosure.
Figure 13:
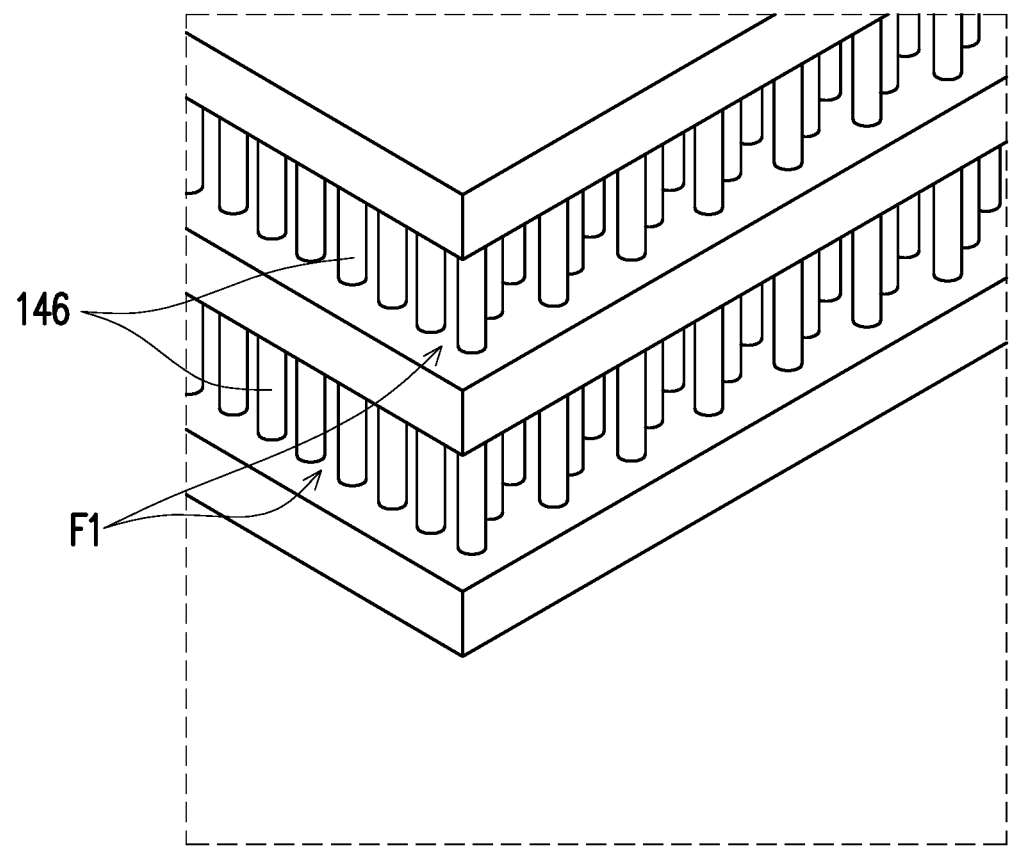
FIG. 13 is a partially enlarged schematic view of an inside of a first case according to another embodiment of the disclosure.

FIG. 11 is a partially enlarged schematic view of an inside of a first case in FIG. 2. FIG. 12 is a partially enlarged schematic view of an inside of a first case according to another embodiment of the disclosure. FIG. 13 is a partially enlarged schematic view of an inside of a first case according to another embodiment of the disclosure. Referring to FIGS. 11 to 13, in different embodiments, an inside of first cases 140A, 140B, and 140C further includes multiple flow channel fins 146 and 146A, which are disposed in the first flow channel C1. For example, shapes of the flow channel fins 146 of the first case 140A is, for example, a columnar shape, as shown in FIG. 11. In addition, shapes of the flow channel fins 146A of the first case 140B is, for example, a wing shape or a sheet shape, as shown in FIG. 12. In another embodiment, in the first case 140C, the flow channel fins 146 may be further designed and configured as multiple layers, which are arranged in the first flow channel C1, as shown in FIG. 13. In this way, the heat convection of the first fluid F1 in the first flow channel C1 may be further improved, and the effect of heat dissipation may be further improved.

Based on the above, in the projection device of the disclosure, a part of the cases of the illumination system, the optical engine module, and/or the projection lens may be designed as the first case, including the first flow channel to transmit the first fluid in the first case. The at least one optical element is disposed in the accommodating space formed by the first case and the second case, and the at least one optical element is the element in the illumination system, the optical engine module, and/or the projection lens, so that the heat generated by the optical element is transferred, by the first fluid in the first case, to the outside of the first case. In the way, the optical element located in the illumination system, the optical engine module, and/or the projection lens may achieve the effect of heat dissipation through the configuration of the first case, which may further save the fan device disposed at the outer side of the first case to reduce the difficulty in assembly and save the circulating air flow channel required by the fan device.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive.

Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection device, comprising:
    a projector case;
    an illumination system configured to provide an illumination beam;
    an optical engine module disposed on a transmission path of the illumination beam to convert the illumination beam into an image beam;
    a projection lens disposed on a transmission path of the image beam to project the image beam out of the projection device;
    at least one first case comprising a first flow channel to transmit a first fluid therein;
    at least one second case connected to the at least one first case to form an airtight enclosed accommodating space, wherein the airtight enclosed accommodating space contains air; and
    at least one optical element disposed in the airtight enclosed accommodating space, wherein heat generated by the at least one optical element is exchanged between the air in the airtight enclosed accommodating space and the at least one first case, and then is transferred, by the first fluid, to an outside of the at least one first case;
    wherein the first fluid does not transmit to any device in the accommodating space;
    wherein the illumination system, the optical engine module, the at least one first case and the at least one second case are disposed inside the projector case.

2. The projection device according to claim 1, wherein the at least one optical element is a wavelength conversion device of the illumination system, at least one light valve of the optical engine module, a prism element of the optical engine module, a part of the projection lens, or a combination of any number of the above.

3. The projection device according to claim 1, further comprising at least one heat dissipation element disposed in the airtight enclosed accommodating space to dissipate the heat from the at least one optical element.

4. The projection device according to claim 1, wherein the at least one optical element is directly connected to the at least one first case.

5. The projection device according to claim 1, wherein the at least one first case further comprises a plurality of heat dissipation fins connected to the first flow channel and located in the airtight enclosed accommodating space.

6. The projection device according to claim 1, wherein the at least one first case further comprises at least one first fastening structure correspondingly connected to the at least one second case.

7. The projection device according to claim 6, wherein the at least one second case comprises at least one second fastening structure correspondingly connected to the at least one first fastening structure.

8. The projection device according to claim 1, wherein the at least one second case comprises a second flow channel to transmit a second fluid therein, and the heat generated by the at least one optical element is further transferred, by the second fluid, to an outside of the at least one second case.

9. The projection device according to claim 8, wherein the first flow channel is connected to the second flow channel, and the first fluid flows through the second flow channel.

10. The projection device according to claim 1, further comprising:
    a cooling device connected to the at least one first case to cool and transmit the first fluid, wherein the cooling device and the at least one first case form a cooling system.

11. The projection device according to claim 10, wherein a number of the at least one first cases is more than one, and the cooling device is connected between the first cases.

12. The projection device according to claim 10, wherein the at least one first case further comprises a plurality of flow channel fins disposed in the first flow channel.

* * * * *